7664X
Park & Peck.
Machine for Making Wadding.
Patented Jul. 10, 1833.
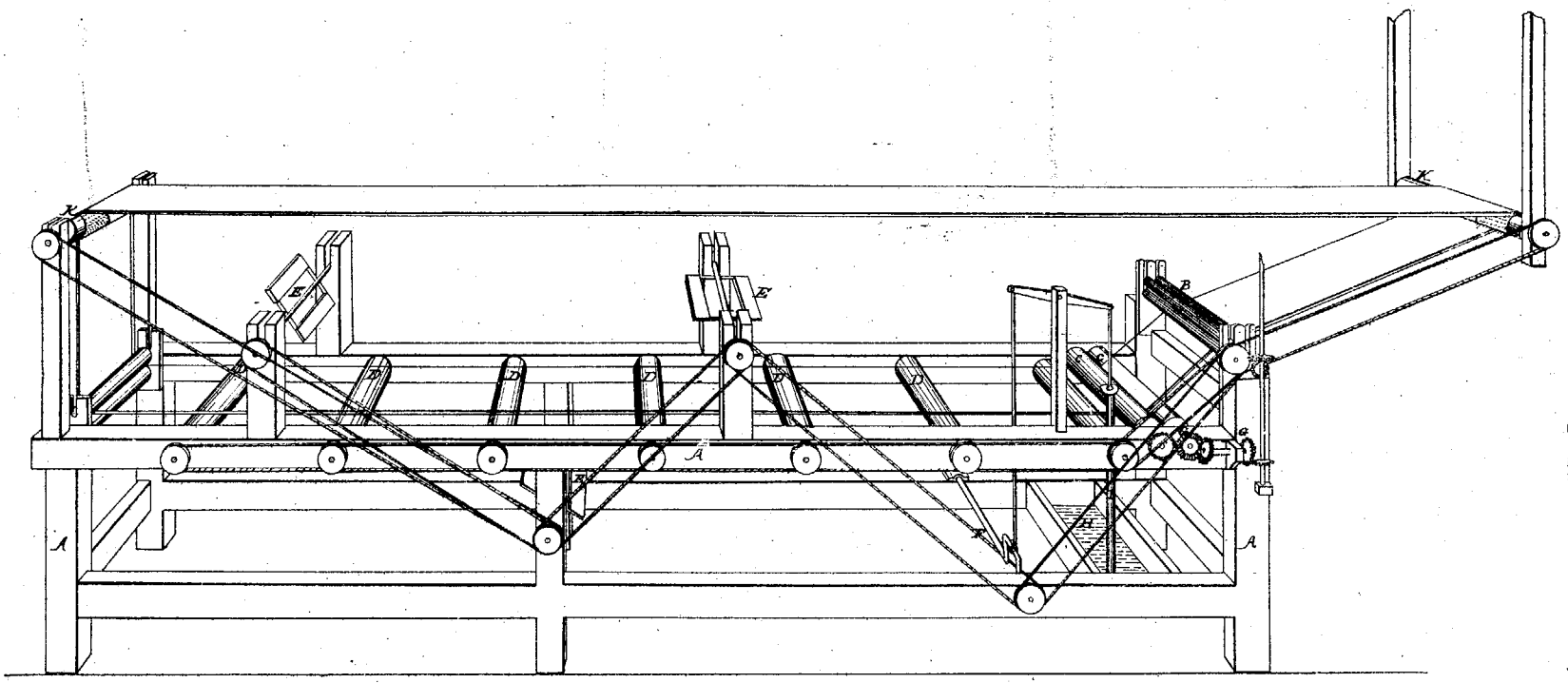
N. PETERS, PHOTO-LITHOGRAPHER, WASHINGTON, D. C.

X 7664 July 10. 1833 91.

John Park & William S. Peck, of West-
moreland in the County of Oneida and State of New York.

Letters Patent.

The schedule referred to in these Letters Patent, and making part of the same, containing a description in the words of the said John Park & William S. Peck, themselves of their improvement in the art of making Cotton Wadding.— — — —

To all to whom these presents shall come.

Be it known that we John Park & William S. Peck, of Westmoreland in the County of Oneida & State of New York, have invented a new and useful improvement in the Art of making Cotton Wadding, and that the following is a full & exact description, of the construction & operation of the said Machine, as invented by us.

We make a frame about three feet in height, and from sixteen to thirty feet in length, the frame may be of any required width, to suit the cards where it is used, the posts at one end of the frame (which we call the front end) are about twelve inches higher, than the plates, on the top of these, we place two set of drawing rollers, one & a half inch in diameter which extend from side to side of the frame, these rollers are geared in such manner that the back set has two revolutions to one of the front ones; back of these rollers, on the plates near the posts, we place two rollers of Metal or stone, which we call the sizing rollers; the diameters of these rollers may be from four to eight inches; they are placed side by side horizontally in a trough constructed in such manner as to hold the sizing on the outside of each roller & at the same time allow the cotton from the drawing rollers to pass between them downward on to a roller lying a little below the back sizing roller, from this roller it is laid on to a set of rollers on the plates; these rollers are from three to

X7664 to four inches in diameter & are placed about eighteen inches apart the whole length of the frame and serve as a conveyor for the wadding from the sizing rollers to the back end of the frame.— These rollers are driven by means of a cord & pulleys from the feeding or drawing rollers. Above & below these rollers, we place a number of fans similar to those used on a common dressing frame.— These fans are driven ~~from~~ a shaft lying on the sills of the frame, which we call the driving shaft; the drawing rollers take their motions from this shaft; the sizing rollers are driven with gear wheels.— From the drawing rollers to supply the sizing rollers with sizing, we place a tub by the side of the frame, near the front end, in which we place a small pump for lifting the sizing into the trough around the sizing rollers.

This pump is driven by means of a cord & pulley from the drawing shaft between the top of the tub & below the roller under the sizing rollers; We place a trough to gather the surplus sizing if any, and return it into the tub again; We likewise place a pair of rollers at the back end of the frame one above the other, which confines the wadding in such a manner, that it can be raised in a perpendicular position on to a set of conveyors which are framed with two rollers, one of which is placed two or more feet above the last mentioned rollers, the other from four to six feet, in front of the frame, we wind cords around these rollers; from two to four inches apart, these form another conveyor, to convey the wadding from the back to the front end of the frame, then driven by means of a cord & pulleys from the drawing rollers.—

The operation of the above described Machine is as follows.— We take a lap from the lap roller of a common cotton Carding Machine & introduce one end of it between the drawing rollers, from the drawing rollers, it passes between the sizing rollers, from the sizing rollers, it passes on to conveyors, which carries it to the back end of the frame

X7664

93 frame, it is then raised nearly perpendicular onto another set of conveyors, which carries it to the front end again, while the wadding is passing from the front to the back, and from the back to the front end of the frame every other part of the machine is in operation.—

What we claim as our invention or discovery consists in the applying and proportioning the above described Machinery, generally & especially the passing the cotton between the drawing & sizing rollers in such a manner as to make a continued sheet, which is sized and dried by the operation of the same Machine.—

Witnesses
Philo C. Curtis
E. P. Barnum

John Park
William H. Peck (Patented 10 July 1833)
Drawing in Portfolio

[illegible]

Exd.
W.G.